United States Patent
Pasupathilingam et al.

(10) Patent No.: US 8,819,703 B2
(45) Date of Patent: Aug. 26, 2014

(54) TECHNIQUES FOR CONTROLLING DESKTOP STATE

(75) Inventors: Sankarasivasubramanian Pasupathilingam, Chidambaram (IN); Srinivasa Ragavan Venkateswaran, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1330 days.

(21) Appl. No.: 12/393,281

(22) Filed: Feb. 26, 2009

(65) Prior Publication Data

US 2010/0218187 A1    Aug. 26, 2010

(51) Int. Cl.
G06F 9/54    (2006.01)
G06F 9/44    (2006.01)
G06Q 10/10    (2012.01)

(52) U.S. Cl.
CPC .............. *G06F 9/4443* (2013.01); *G06F 9/542* (2013.01)
USPC .......................................... 719/318; 709/204

(58) Field of Classification Search
USPC ........................................................ 719/318
See application file for complete search history.

(56) References Cited

U.S. PATENT DOCUMENTS

| | | | |
|---|---|---|---|
| 5,280,591 A | 1/1994 | Garcia et al. | |
| 5,692,143 A | 11/1997 | Johnson et al. | |
| 7,188,315 B2 | 3/2007 | Chen et al. | |
| 8,108,519 B2 * | 1/2012 | Zhang et al. | 709/225 |
| 2005/0132005 A1 * | 6/2005 | Horvitz et al. | 709/204 |
| 2006/0052089 A1 * | 3/2006 | Khurana et al. | 455/414.1 |
| 2006/0184828 A1 * | 8/2006 | Wynn et al. | 714/38 |
| 2007/0021873 A1 * | 1/2007 | Richards | 700/286 |
| 2007/0022155 A1 * | 1/2007 | Owens et al. | 709/202 |
| 2008/0276254 A1 | 11/2008 | Lapuyade | |

OTHER PUBLICATIONS

Roy Campbell et al "Towards Security and Privacy for Pervasive Computing", 2003.*

* cited by examiner

*Primary Examiner* — Lechi Truong
*Assistant Examiner* — Abdou Seye
(74) *Attorney, Agent, or Firm* — Osha Liang LLP

(57) ABSTRACT

Techniques for controlling desktop state are provided. Processing events are associated with desktop states and are associated with resource actions. When a desktop encounters the processing events and a known state is established, automated actions are forced on the resources to customize the known state.

2 Claims, 3 Drawing Sheets

United States Patent US 8,819,703 B2

TECHNIQUES FOR CONTROLLING DESKTOP STATE

BACKGROUND

Increasingly users are taking their computing devices with them as they travel. These devices are frequently used when employees give presentations. The presentations can occur via the Internet and the World-Wide Web (WWW), via a webcast, and/or live in person at a site where the presentations are given. Many times while a user gives a presentation, a variety of problems can occur.

For example, the user may engage in an interactive question and answer period and during such time the user's Internet connection is dropped because of lack of detected activity. Another situation is that the user's screen saver kicks in to display some potentially embarrassing photos of the employee. Still further, someone may instant message (IM) the user during the presentation and a popup window with the text of the IM may appear for all to see even when the message was intended to remain private.

Moreover, it is not just public presentations that cause problems for users. That is, the user may be privately working on their laptop on an important project and because the user is thinking or doing something else for a brief intervening period, the laptop can unilaterally take some action that the user does not want to occur, such as putting the hard disk to sleep, turning off the power, disconnecting from the Internet, etc.

As still another example, the user may be processing an important application or attempting to get a presentation out for management, when the user's monthly virus scan kicks to scan the user's hard drive for viruses or when the user's virus software performs a daily or weekly update to catch new virus definitions from the vendor. In these situations and others, the user can become extremely frustrated and if the user is not savvy enough the user will have to wait for the other activity to subside before the user can effectively continue the work that the user was initially focused on. In some situations, the user wants maximum processing throughput and does not want normal scheduled activities to take place and thereby consume some much needed processing cycles of the user's computing device.

Thus, what is needed is a mechanism for custom controlling a user's desktop state.

SUMMARY

In various embodiments, techniques for controlling desktop state are provided. More specifically, and in an embodiment, a method is provided for controlling a client desktop's state.

DETAILED DESCRIPTION

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output.

The term "principal" is a special type of resource that includes a verifiable identity within an electronic context. Some example principals include a user and automated services that process on machines (processing devices). Principals can also include physical hardware devices such as proxies, clients, servers, peripherals, databases, bridges, routers, hubs, etc. So, the term principal includes a user but is broader than a user.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment."

In an embodiment, a "client" is a single physical computing device of a user that includes its own processing environment and that may or may not be connected to a network, such as the Internet or a secure Intranet site. The client includes a number of resources, such as software programs and system that execute within the processing environment of the client on behalf of and in some cases at the explicit direction of the user.

Various embodiments of this invention can be implemented in existing network architectures, computing devices, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, computing devices, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
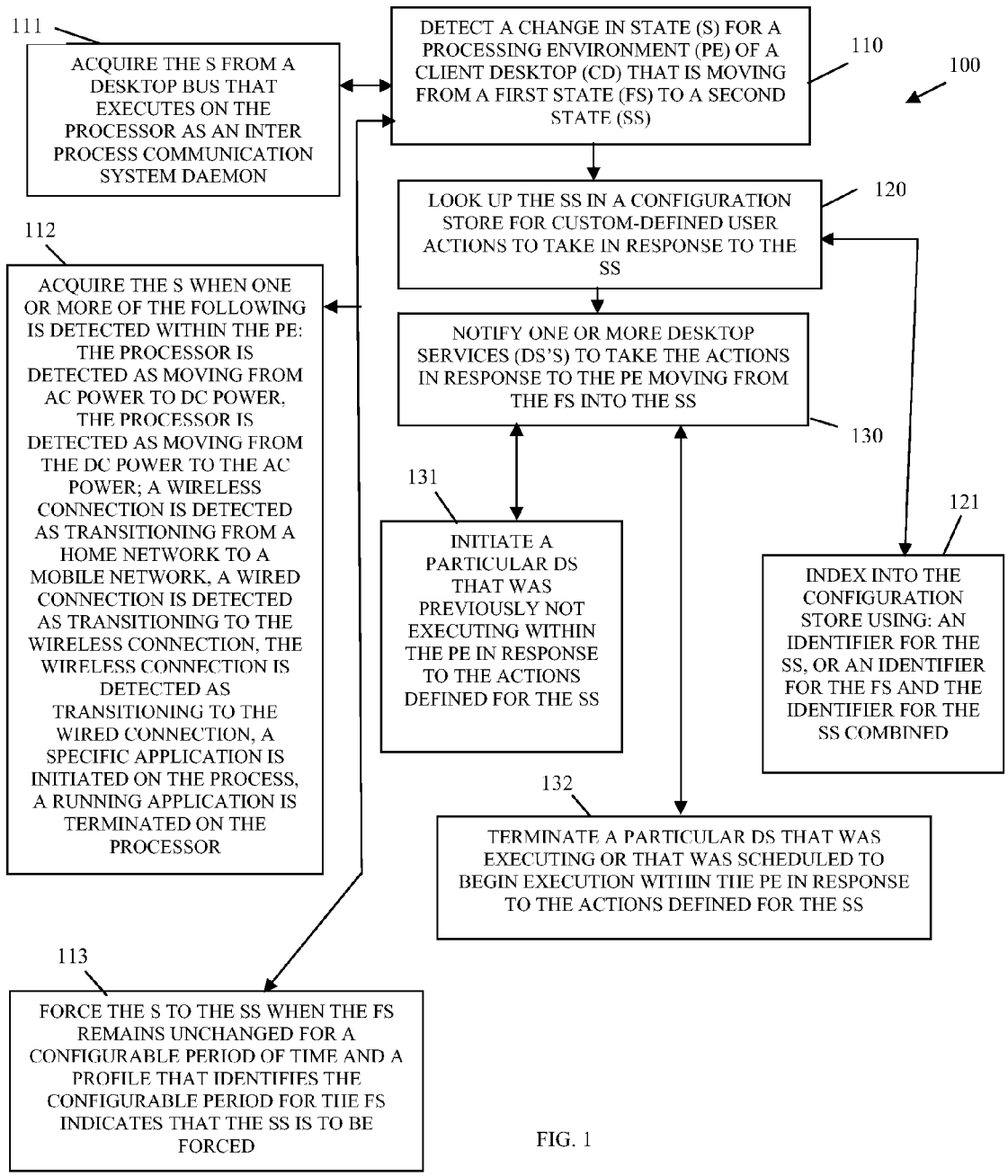
FIG. 1 is a diagram of a method for controlling a client desktop's state, according to an example embodiment.

FIG. 1 is a diagram of a method 100 for controlling a client desktop's state, according to an example embodiment. The method 100 (hereinafter "desktop state controller") is implemented as instructions in a machine-accessible and computer-readable storage medium. The instructions when executed by a machine (computer, processor, etc.), which is configured to process the desktop state controller, perform the processing depicted in FIG. 1. The desktop state controller is also operational over and processes within a network. The network may be accessible via connections that are wired, wireless, or a combination of wired and wireless.

At 110, the desktop state controller detects a change in state for a processing environment of a client desktop (may also be referred to as "client"). The change in state indicates that the client desktop is moving from a first or original state to a new or second state. Detection of the change in state can occur in a variety of manners.

For example, at 111, the desktop state controller acquires the change in state from a desktop bus ("dbus") that executes on the processor as an inter-process communication (IPC) system daemon. This service is generally available in LINUX operating systems and provides for IPC information. The desktop state controller uses this information to detect the events occurring in the processing environment and to determine when a change of state has occurred.

According to an embodiment, at 112, the desktop state controller acquires the change of state when one or more of the following situations are detected in response to the events: 1) the processor is detected as moving from alternating current (AC) power to direct current (DC) power; 2) the processor is detected as moving from DC power to AC power; 3) a wireless connection is detected as transitioning from a home or enterprise network to a mobile or different network; 4) a wired connection is detected as transitioning to a wireless connection; 5) a wireless connection is detected as transitioning to a wired connection; 6) a specific application or service is initiated on the processor; and/or 7) a running application is terminated on the processor.

So, the state can be related to hardware or environmental settings, such as power source and network connectivity. The state can also be related to software processing, such as initiation of applications and/or termination of applications.

In one scenario, at 113, the desktop state controller forces the change of state to the second state when the first state remains unchanged for a configurable period of time and a profile indicates or identifies the configurable period of time for the first state to indicate that the second state is to be forced. This can be a situation where a user is processing one particular application, such as a presentation service for X minutes uninterrupted and the user has previously indicated that given this circumstance a presentation (second) state is to be entered or defined.

At 120, the desktop state controller looks up the second state in a configuration store for custom-defined user actions to take in response to the second state. That is, a user can custom define the events that comprise the second state and can custom define actions to take when the second state is detected on the client desktop. A variety of actions can be taken, some of which are defined below in various embodiments discussed below.

In an embodiment, at 121, the desktop state controller indexes into the configuration store using: an identifier for the second state or an identifier for the first state and the identifier for the second state combined. So, the configuration store can be used to find the actions to instruct the other services of the client desktop using identifiers for the second state or a dual index value that includes an identifier for the first state and second state.

At 130, the desktop state controller notifies or instructs one or more desktop services to take the actions in response to or based on the processing environment of the client desktop moving from the first state into the second state. Again a variety of actions (discussed herein and below) can be taken.

For example, at 131, the desktop state controller initiates a particular desktop service that was previously not executing within the processing environment in response to or based on the actions defined in the second state.

In another case, at 132, the desktop state controller terminates a particular desktop service that was executing or that was scheduled to begin execution within the processing environment in response to or based on the actions defined for the second state.

A variety of situations and implementations can occur that utilize the desktop state controller. Some of which are now presented below.

Consider an employee that is giving an open-office presentation to a large audience, introducing an enterprise product. The open-office impress is running a slide show. Now embarrassing possibilities are likely to occur without the desktop state controller, such as:

1) The employee gets a "Hello dear! When are you coming home tonight," message notification because his wife sent it in the messenger service of the client desktop, which automatically connected to the wireless network available at the presentation site. Also, the employee's screensaver begins to show random photos from his photo application while he is busy in a question and answering section of the presentation; or the screen may go entirely blank during this section of the presentation.
2) A webcast from a Universal Resource Locator (URL) link, where the employee is streaming something and a demo times out, since there are no requests being sent to the server during this time.

All these situations and others can be avoided by using the desktop state controller. In an embodiment, the desktop state controller is a dbus based "desktop state based session controller." In this approach, one can get the state of the desktop explicitly as well as the state changes on certain predefined or desired events.

Some example custom-defined desktop states can include: presentation state, secure state, wireless roaming state, gaming state, multimedia state, etc.

So, if an employee has setup a presentation state, the desktop state controller can automatically and dynamically do the following to the desktop:

1) disable any notification in the notification area; so, none of the employee's buddy-alerts, IM windows do open and embarrass the employee, while he is giving the presentation;
2) the brightness of the screen remains constant until the employee changes the state, and screen savers can be disabled as well; and/or
3) a keep-alive ping is sent to the web-pages the employee has opened so that none of the sessions he has opened disappear.

Similarly, if a user has setup a "secure state," none of the user's chat logs, IM logs, websites visited are ever logged. So, this is a complete privacy mode. A user can use this to chat with his Girlfriend during office hours. All cookies and sessions that are opened during this mode are cleared. The desktop state controller pushes this privacy policy to the individual applications also. For example, instructions can be sent to command the chrome (browser) to start in an incognito mode.

If a user enters a gaming state, all CPU intensive operations, such as, desktop search indexing can be disabled. So, the user's game gets the maximum CPU cycles it needs.

If a user enters a roaming state, the processing environment of the client desktop goes into a power-save mode. The desktop does not download software updates etc. since every little bit of downloaded content can cost more if the user is travelling travelling (especially in foreign countries). Also, if a user is travelling without access to a charging station, the user does not want to run anything using highly CPU intensive operations so as to deplete the battery power of the client desktop.

Furthermore, if the client desktop is moved to a multimedia state, then a screensaver can be disabled. The desktop can be automatically moved to the multimedia state if a file being played is more than 2 minutes (configured amount of time).

The desktop state controller is a desktop wide application that sits and listens to the state changes and notifies/commands individual applications of the state changes and of the dbus broadcasts regarding IPC events.

Automatic changes to desktop state is based on predefined events. So, when a user does a slide-show in OpenOffice, the user automatically enters a presentation mode (state), etc.

Thus, the desktop state controller can be used to identify and control various desktop modes (states) and the predefined response pattern(s) that are desired. Furthermore, the desktop state controller can be used for the disabling of notifications and for selectively enabling critical notifications alone (like low battery etc.).

Figure 2:
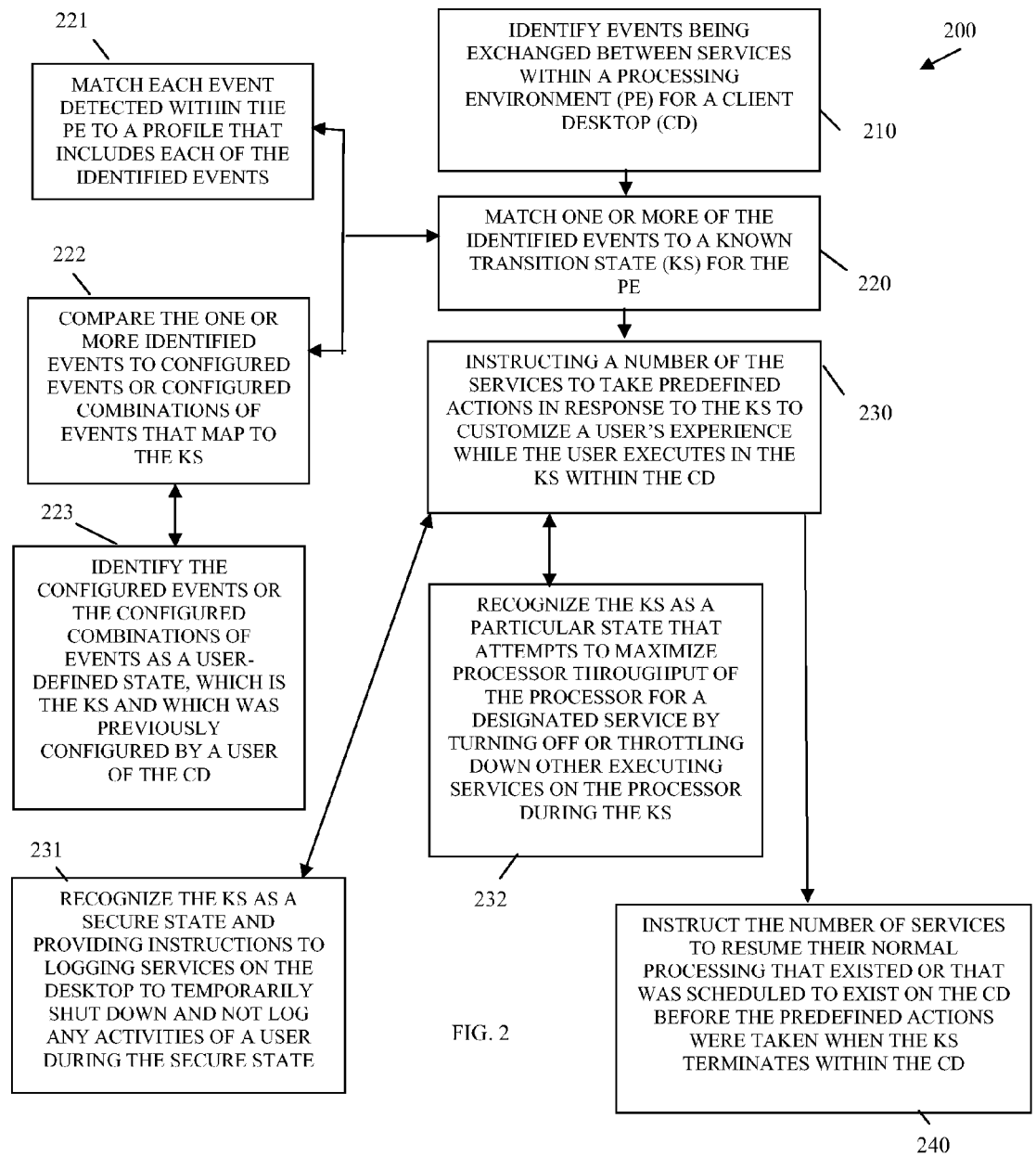
FIG. 2 is a diagram another method for controlling a client desktop's state, according to an example embodiment.

FIG. 2 is a diagram another method 200 for controlling a client desktop's state, according to an example embodiment. The method 200 (hereinafter "desktop controller service") is implemented as instructions in a machine-accessible and computer-readable storage medium. The instructions when executed by a machine (computer, processor, etc.), which is configured to process the desktop controller service, perform the processing depicted in FIG. 2. The desktop controller service is also operational over and processes within a network. The network may be accessed via connections that are wired, wireless, or a combination of wired and wireless.

The desktop controller service presents another and in some cases an enhanced perspective of the desktop state controller, which was discussed above with reference to the method 100 of the FIG. 1.

At 210, the desktop controller service identifies events being exchanged between services (applications, modules, systems, etc.) within a processing environment for a client desktop (client). This can be done in a variety of manners, such as via a dbus IPC approach (discussed above) and others.

At 220, the desktop controller service matches one or more of the identified events to a known transition state for the processing environment. Again, a principal (automated application or user) can define the events that comprise the known transition state for the processing environment.

According to an embodiment, at 221, the desktop controller service matches each event detected within the processing environment to a profile that includes each of the identified events. So, a profile or policy can define the events and map those identified events to the particular known transition state.

In another embodiment, at 222, the desktop controller service compares the one or more identified events to configured events or configured combinations of events that then map to the known transition state. One event or selective combinations of events can map to the known transition state.

Continuing with the embodiment at 222 and at 223, the desktop controller service identifies the configured events or the configured combination of events as a user-defined state, which is the known transition state and which was previously configured by a user of the client desktop. Again, users can custom defined the events and the known transition state to improve the user's experience on the client desktop.

At 230, the desktop controller service instructs a number of the services to take predefined actions in response to the known transition state for purposes of customizing the user's experience while the user executes services within the known transition state on the client desktop.

In a particular case, at 231, the desktop controller service recognizes the known transition state as a secure state. As a result, the desktop controller service provides instructions to logging or auditing services on the desktop informing the logging and/or auditing services to temporarily shut down or not log any activities of a user during the secure state. This can be viewed as a privacy mode that the user can enter where cache, logs, and notifications are not captured or written to.

In another situation, at 232, the desktop controller service recognizes the known transition state as a particular state that attempts to maximize processor throughput of the processor for a designated service by turning off or throttling down other executing services on the processor during the known transition state.

In an embodiment, at 240, the desktop controller service instructs a number of the services to resume their normal processing that existed or that was scheduled to exist on the client desktop before the predefined actions were taken when the known transition state terminates within the client desktop.

Figure 3:
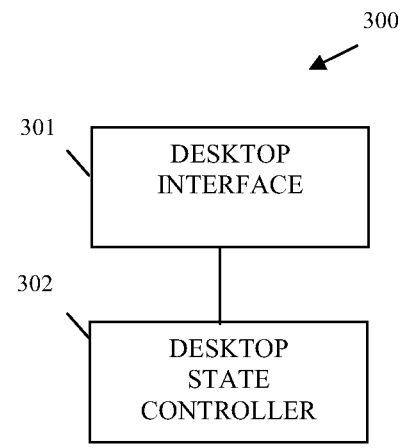
FIG. 3 is a diagram a desktop state controller system, according to an example embodiment.

FIG. 3 is a diagram a desktop state controller system 300, according to an example embodiment. The desktop state controller system 300 is implemented as instructions (within a machine-accessible and computer-readable storage medium) that when executed by a machine (processor, etc.) perform, among other things, the processing discussed above with respect to the method 100 of the FIG. 1 and the processing discussed above with respect to the method 200 of the FIG. 2. Moreover, the desktop state controller system 300 is operational over a network, and the network is accessible over connections that may be wired, wireless, or a combination of wired and wireless.

The desktop state controller system 300 includes a desktop interface 301 and a desktop state controller 302. Each of these components of the credential auditing system 300 and their interactions with one another will now be discussed in detail.

The desktop interface 301 is implemented in a computer-readable storage medium and executes on a processor of a client desktop. Example aspects of the desktop interface 301 were discussed above with reference to the methods 100 and 200 of the FIGS. 1 and 2, respectively.

During operation, a principal interacts with the desktop interface 301 to define a known desktop state. This definition provides one or more known events that when detected or that when occur within a processing environment of the client desktop defines or is associated with the known desktop state. The principal also uses the desktop interface 301 to associate one or more actions for automatically and dynamically processing when the client desktop enters the known desktop state.

According to an embodiment, the principal is a user, an administrator, or an automated agent that executes on the processor of the client desktop.

Additionally, the principal can custom define the known desktop state and custom define a description associated with the known desktop state via the desktop interface 301.

In an embodiment, the desktop interface 301 enforces policy restrictions against the principal to prevent some actions from being defined with the known desktop state when the principal lacks proper security to define such actions.

The desktop state controller 302 is implemented in a computer-readable storage medium and executes on the processor or the client desktop. The processing associated with the desktop state controller 302 was described in detail above with reference to the methods 100 and 200 of the FIGS. 1 and 2, respectively.

The desktop state controller 302 dynamically, automatically, and in real time monitors processing events occurring within the processing environment of the client desktop. When a match to detected events occurs with the one or more known events, the desktop state controller 302 instructs the one or more services of the client desktop to take the one or more actions on behalf of the principal.

According to an embodiment, at least one of the actions are used to alter a schedule associated with an automated service, which is scheduled to begin execution on the processor of the desktop client during the known desktop state. For example, a virus scan may be scheduled to shortly begin after a known state is entered where CPU cycles are critical (DC power for the client desktop, special processing being done by the principal on the client desktop, etc.) in such a case, the schedule is altered so the virus scan is delayed until after the known state completes or is reset to occur at a next scheduled date and time.

In another situation, at least one of the known events include other limitations that are evaluated when that particular event is encountered. The evaluation of the other limitations assist in identifying the known desktop state. For example, when a user enters into a presentation application for more than a few minutes and is strictly processing within the presentation than these other limitations of time and exclusivity of control can be used to set the state to a presentation mode.

Figure 4:
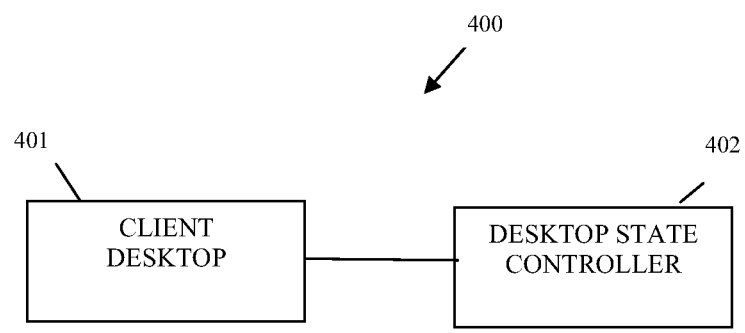
FIG. 4 is a diagram of another desktop state controller system, according to an example embodiment.

FIG. 4 is a diagram of another desktop state controller system 400, according to an example embodiment. The desktop state controller system 400 is implemented as instructions on or within a machine-accessible and computer-readable storage medium. The instructions when executed by one or more machines (processor, computer, etc.) perform processing depicted with respect to the methods 100 and 200 of the FIGS. 1-2, respectively. The desktop state controller system 400 is also operational over a network, and the network may be accessed over connections that are wired, wireless, or a combination of wired and wireless.

The desktop state controller system 400 presents another and in some cases enhanced perspective of the desktop state controller system 300, discussed above with reference to the FIG. 3.

The desktop state controller system 400 includes a client desktop 401 and a desktop state controller 402. Each of these and their interactions with one another will now be discussed in detail.

The client desktop 401 has a processor and memory and also includes a plurality of resources that execute on the processor of the client desktop 401. Example aspects of the client desktop 401 were presented above with reference to the methods 100 and 200 of the FIGS. 1 and 2, respectively, and with respect to the system 300 of the FIG. 3.

During operation, a user custom defines a particular desktop state by predefining one or more events associated with the resources and the user associates actions to instruct select ones of the resources to take when the particular desktop state is detected in a processing environment of the client desktop 401.

According to an embodiment, at least one action is associated with a particular resource that is not yet executing on the processor but is scheduled to execute or has the potential to execute during the particular desktop state. So, when a state is entered a schedule may show that within some configurable period of time application X is to begin, such as a download, an update, a virus scan, etc. Because the schedule indicates it is to occur within a threshold period of time, the action can reschedule or abort the schedule in response to the state detected.

In another case, at least one action is associated with terminating a particular resource as soon as it is detected to have started for execution on the processor during the particular desktop state. So, an action may not be proactive as discussed above where a schedule is altered in advance of execution but the action can be reactive where it terminates a service or application during the state as soon as it is detected to have initiated on the client desktop 401.

In yet another case, at least one action is associated with disabling a feature of a particular resource during the particular desktop state. For example, a logging or auditing feature of an application can be shut down during a secure state. So, an entire service or application need not be terminated but rather a single feature of a service or application can be disabled.

The desktop state controller 402 is implemented in a computer-readable storage medium of the client desktop 401 and executes on the processor of the client desktop 402. Example aspects of the desktop state controller 402 was presented in detail above with reference to the methods 100 and 200 of the FIGS. 1 and 2, respectively, and with respect to the system 300 of the FIG. 3.

The desktop state controller 402 matches the events occurring in the processing environment to identify the particular desktop state, and the desktop state controller 402 instructs the select resources to take the actions defined for that desktop state.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method that is adapted to be executed by a processor to perform the method, comprising:

receiving, by a desktop state controller, inter-process communication information from a desktop bus executing in a processing environment of a client desktop;

identifying, by the desktop state controller using the inter-process communication information, events being exchanged between applications executing in the processing environment;

matching each event detected within the processing environment to a profile that includes each of the identified events;

matching one or more of the identified events to a known transition state for the processing environment;

comparing the one or more identified events to configured events or configured combinations of events that map to the known transition state;

identifying the configured events or the configured combinations of events as a user-defined state, which is the known transition state and which was previously configured by a user of the client desktop; and instructing a number of services to take predefined actions in response to the known transition state to customize a user's experience while the user executes in the known transition state within the client desktop, wherein instructing the number of services to take the predefined actions comprises one selected from a group consisting of:
(i) recognizing the known transition state as a secure state and providing instructions to logging services on the desktop to temporarily shut down and not log any activities of a user during the secure state; and
(ii) recognizing the known transition state as a particular state that attempts to maximize processor throughput of the processor for a designated service by turning off or throttling down other executing services on the processor during the known transition state.

2. The method of claim 1 further comprising, instructing the number of services to resume their normal processing that existed or that was scheduled to exist on the client desktop before the predefined actions were taken when the known transition state terminates within the client desktop.

* * * * *

UNITED STATES PATENT AND TRADEMARK OFFICE
CERTIFICATE OF CORRECTION

| | |
|---|---|
| PATENT NO. | : 8,819,703 B2 |
| APPLICATION NO. | : 12/393281 |
| DATED | : August 26, 2014 |
| INVENTOR(S) | : Pasupathilingam et al. |

It is certified that error appears in the above-identified patent and that said Letters Patent is hereby corrected as shown below:

In the Claims,

In column 8, line 45, in Claim 1, after "method" delete "comprising,".

Signed and Sealed this
Seventeenth Day of March, 2015

Michelle K. Lee
*Director of the United States Patent and Trademark Office*